United States Patent
Namyslo

(10) Patent No.: US 10,453,364 B2
(45) Date of Patent: Oct. 22, 2019

(54) REPRESENTATION OF SPECIFIC INFORMATION ON AN APPARATUS

(71) Applicant: Siemens Aktiengesellschaft, München (DE)

(72) Inventor: Lutz Namyslo, Hausen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/064,362

(22) PCT Filed: Dec. 14, 2016

(86) PCT No.: PCT/EP2016/081002
§ 371 (c)(1),
(2) Date: Jun. 20, 2018

(87) PCT Pub. No.: WO2017/108533
PCT Pub. Date: Jun. 29, 2017

(65) Prior Publication Data
US 2019/0005859 A1    Jan. 3, 2019

(30) Foreign Application Priority Data
Dec. 21, 2015    (EP) ..................... 15201629

(51) Int. Cl.
*G09F 9/37* (2006.01)
*G09F 23/00* (2006.01)
(Continued)

(52) U.S. Cl.
CPC .............. *G09F 9/372* (2013.01); *G09F 23/00* (2013.01); *H04W 4/029* (2018.02); *H04W 4/38* (2018.02)

(58) Field of Classification Search
CPC . G09F 9/372; G09F 23/00; G09F 3/02; G06F 3/147; G06F 3/14; G09G 3/344;
(Continued)

(56) References Cited

U.S. PATENT DOCUMENTS

| 6,924,781 | B1 * | 8/2005 | Gelbman | .............. | G06F 3/1454 340/10.6 |
| 7,098,869 | B2 * | 8/2006 | Vaitekunas | ............... | G06F 3/14 345/2.1 |

(Continued)

FOREIGN PATENT DOCUMENTS

| DE | 101 37 588 A1 | 2/2003 |
| DE | 20 2013 000 952 U1 | 10/2013 |

(Continued)

*Primary Examiner* — Collin X Beatty
(74) *Attorney, Agent, or Firm* — Henry M. Feiereisen LLC

(57) ABSTRACT

The suitable representation of information on the outside of an apparatus is intended to be simplified. For this purpose, an arrangement having an apparatus (2) and a display device (1), which has electronic paper and is fastened to the apparatus, is provided. The display device (1) has a localization module which can be used to determine an item of country information relating to that country in which the arrangement is currently situated. The display device (1) is also designed to represent predefined data relating to the apparatus specifically on the basis of the country information.

10 Claims, 2 Drawing Sheets

(51) Int. Cl.
*H04W 4/38* (2018.01)
*H04W 4/029* (2018.01)

(58) Field of Classification Search
CPC ........... G09G 2370/16; G09G 2380/04; G06Q 30/0266
USPC ......................................................... 359/237
See application file for complete search history.

(56) References Cited

U.S. PATENT DOCUMENTS

| | | | | |
|---|---|---|---|---|
| 7,669,768 B2* | 3/2010 | Gelbman | ............... | G06F 3/1454 235/375 |
| 7,904,277 B2* | 3/2011 | Ady | ................... | G06Q 20/3674 340/5.91 |
| 8,584,930 B2* | 11/2013 | Cohen | ................... | G09G 3/344 235/375 |
| 2002/0167500 A1* | 11/2002 | Gelbman | .................. | G06F 3/14 345/204 |
| 2002/0180688 A1* | 12/2002 | Drzaic | ................... | B41J 3/4076 345/107 |
| 2003/0035149 A1* | 2/2003 | Ishikawa | .............. | G03C 8/4013 358/302 |
| 2003/0234777 A1* | 12/2003 | Wampler | ................ | G06Q 30/02 345/204 |
| 2004/0156170 A1* | 8/2004 | Mager | .................. | A47L 15/4293 361/679.01 |
| 2007/0024551 A1* | 2/2007 | Gelbman | .................. | G06F 3/14 345/85 |
| 2008/0303637 A1* | 12/2008 | Gelbman | ........... | G06K 7/10079 340/10.42 |
| 2010/0024954 A1* | 2/2010 | Ito | ......................... | B32B 38/185 156/64 |
| 2010/0078330 A1* | 4/2010 | Hyodo | .................... | C23C 18/14 205/138 |
| 2010/0177660 A1* | 7/2010 | Essinger | ................. | H04W 4/50 370/254 |
| 2015/0116296 A1* | 4/2015 | Greene | .................. | H04B 5/0037 345/211 |
| 2016/0205238 A1* | 7/2016 | Abramson | .......... | G01C 21/3484 455/456.4 |
| 2018/0186331 A1 | 7/2018 | Dubal et al. | | |

FOREIGN PATENT DOCUMENTS

| | | |
|---|---|---|
| EP | 2 837 978 A1 | 2/2015 |
| WO | WO 2013101046 | 7/2013 |
| WO | WO 2016007192 A1 | 1/2016 |

* cited by examiner

REPRESENTATION OF SPECIFIC INFORMATION ON AN APPARATUS

CROSS-REFERENCES TO RELATED APPLICATIONS

This application is the U.S. National Stage of International Application No. PCT/EP2016/081002, filed Dec. 14, 2016, which designated the United States and has been published as International Publication No. WO 2017/108533 and which claims the priority of European Patent Application, Serial No. 15201629.1, filed Dec. 21, 2015, pursuant to 35 U.S.C. 119(a)-(d).

BACKGROUND OF THE INVENTION

The present invention relates to an arrangement having an apparatus and a display device that has an electronic paper and is secured to the apparatus. Moreover, the present invention relates to a method for displaying an item of information relating to an apparatus using a display device of this kind.

In conformance with predetermined directives or standards, machines must have a complete and unambiguous identification label. For this reason, they bear a so-called nameplate (also called a rating plate), the "ID" of an industrial product. This informs the buyer, operator, user, etc. of the manufacturer, year of construction, certifications and conformity, and provides important technical data such as the performance data and safety notices. Specifically in the case of safety notices, the machines or apparatuses have to be equipped with appropriate country-specific warning notices.

Regulations on nameplates or rating plates and warning and safety notices can be found, among other places, in the following standards and directives:
for machines manufactured in Europe generally, the Machinery Directive 2006/42/EC;
for electrical machines (in particular motors), DIN EN 60034-1 and NEMA MG1;
for adjustable speed drives (including frequency converters), DIN EN 61.800-2.

It should be noted here that motors do not now fall under the Machinery Directive ("partly completed machinery"). The Machinery Directive should be applied to frequency converters if they have functions relevant to safety (functional safety), though this is almost always standard nowadays.

FIG. 1 shows a conventional nameplate for an electric motor. It shows technical information on the electric motor in German and English. This information cannot be read by people who do not have a command of German and English, and for this reason nameplates typically have to be produced specifically for each country.

According to the Machinery Directive 2006/42/EC (which applies in the territory of Europe), the following requirements apply to nameplates: "All machinery must be marked visibly, legibly and indelibly with the following minimum particulars:
the business name and full address of the manufacturer and, where applicable, his authorized representative,
designation of the machinery,
the CE Marking (see Annex III),
designation of series or model,
serial number, if any,
the year of construction, that is the year in which the manufacturing process is completed.

It is prohibited to pre-date or post-date the machinery when affixing the CE marking."

"Information and warnings on the machinery should preferably be provided in the form of readily understandable symbols or pictograms. Any written or verbal information and warnings must be expressed in the official Community language or languages, which may be determined in accordance with the Treaty by the Member State in which the machinery is placed on the market and/or put into service and may be accompanied, on request, by versions in any other official Community language or languages understood by the operators."

The following requirements of nameplates apply under DIN EN 60034-1:

"All electrical machinery must be fitted with a rating plate (rating plates). The plates must be made of durable material and be fastened securely. The rating plate (rating plates) must be fastened preferably to the housing of the machinery and mounted such that it (they) is (are) readily legible in the position of use as determined by the construction and installation. If the electrical machinery is enclosed or incorporated into the device such that its rating plate is not readily legible, on request the manufacturer must supply a second plate, which is to be fastened to the device."

Requirements of warning notices for adjustable speed drives under DIN EN 61800-2:

"The manufacturer must supply and attach safety and warning notices as required by the regulations and standards at the site of use of the equipment (if known) and by IEC 60204-1. They must be expressed in the appropriate language(s) of the site of use. If the site of use of the user is not known, the warning notices are supplied at the same time and attached in accordance with the regulations and standards of the country of origin and with IEC 60204-1. They must be expressed in the language(s) of the country of origin."

Requirements of warning notices and equipment identifiers under DIN EN 60204-1:

"Warning notices, nameplates, identification labels and designation plates must be of sufficient durability to withstand the respective ambient conditions. Equipment (e.g. switchgear assemblies) must be identified legibly and indelibly such that the identification label is readily visible after installation."

Requirements under DIN EN 61800-5-1:

"If no international symbol is available, a designation must
be written in a suitable language or a language that is associated with a particular technical field;
be conspicuous, legible and indelible;
be clear and concise."

The regulations quoted above give rise to the following problems, with the following approaches to solutions:
a) The variation in the plates to be produced continues to grow, because of country-specific requirements (multilingualism). The plates are thus produced with the corresponding variations. Blanks for plates are kept in stock.
b) The number of items of information to be displayed continues to grow (warnings, multiple languages). However, the space available is typically limited, so additional items of information cannot continue to be displayed in the conventional and required size. Thus, the plates are becoming larger and larger. Typically, a compromise is found between typeface size, plaintext and the use of pictograms and abbreviations.

c) If the intended destination is not yet known at the time of production, additional plates for all the official languages of the possible intended destination have to be provided. Accordingly, additional plates and accompanying notes in the official languages of the possible intended destination are provided with the product. For example, as things stand a frequency converter from the Applicant needs to be provided with warnings in 37 different languages.

d) If the plate is not legible when the apparatus is in its position of use, an identical additional plate has to be provided with the product. A provided plate of this kind is then glued on or mounted by the commissioning engineer.

e) When older machinery is upgraded, it may be necessary to produce a new nameplate. This has to be provided with the "upgrade kit" at the time of delivery. Thus, in practice it must be ensured at the time of upgrade that the old plate is replaced by the new one.

f) In their present form, plates can only be read electronically (e.g. by barcode readers) if there is a direct line of sight. As digitalization progresses, the possibility of reading without a direct line of sight becomes more and more important (for example at customs or incoming or outgoing goods inspection without opening the packaging; at inaccessible locations in a plant, or during operation, without the need to open the door of a switch cabinet). No direct solutions are known for this. Thus, for customs or incoming or outgoing goods inspection, a plate is usually additionally glued to the packaging.

So-called "electronic paper" (e-paper or ePaper for short) is known as a display technology. Using electronic paper of this kind, the attempt is made to mimic the appearance of ink on paper. E-paper displays reflect the light like ordinary paper, that is to say they are passive (non-illuminated) displays. Screens of this kind are also referred to by the term "reflective displays". With some display technologies, texts or images are displayed continuously without the need for a voltage to maintain this. However, the display can be changed at a later point. Electronic paper from some manufacturers is flexible, like ordinary paper (source: https://de.wikipedia.orq/wiki/Elektronisches_Papier).

E-paper displays operate by the principle that they orient electrically charged, pigmented particles in a microcapsule by the application of an electrical field. For the construction of e-paper modules, the developer connects an FPL foil (front plane laminate, which contains the microcapsules) to an active matrix TFT backplane, and seals them together with a protective film. Using the TFT backplane, the developer divides up the FPL to the predetermined resolution and gives it the desired image display using the integrated graphic controller. The panels are controlled by way of the integrated chip-on-glass IC and the timing control software. The software is either located on the main processor or on a separate T-CON board or chip.

The optics and legibility are not dependent on the angle of view, are able to display excellent levels of grayscale, and provide a contrast comparable with print on white paper. Because e-paper is a reflective technology, legibility in sunlight is excellent.

Nowadays, e-papers can already be made with a color in addition to black and white, such as red or other colors, and are about to enter serial production.

The displayed content can be output electronically over a radio connection, such as WLAN, ZigBee, Bluetooth or NFC (near field communication). Factory settings may likewise be made by radio communications. In contrast to many display technologies, e-paper can display QR and 3D barcodes and is readable by IR or laser readers. They are thus perfect for logistics applications or active price labels in shops (keyword: ESL, electronic shelf label).

In a further application for e-paper displays, at London Heathrow airport Densitron has developed an electronic baggage label that is intended to replace the traditional BA barcode pendant label made of paper. The e-paper displays only need power when the display is updated, so they can be re-used almost any number of times as desired. The labels communicate with the cellular telephone of the person traveling by way of NFC.

The printed specification DE 20 0243 000 952 U1 discloses a remote-controllable display technology on a truck, formed by a combination of display modules based on electronic paper and a GPS unit, with the possibility of data exchange by radio communications technology. Warnings and advertising can be displayed on the rear of a truck in a manner dependent on its location.

Further, the printed specification EP 2 837 978 A1 discloses an electronic control device for controlling a plant. The plant may have sensors and a motor, switching devices and similar. Moreover, it has electronic paper for displaying information.

SUMMARY OF THE INVENTION

The object of the present invention is to simplify the country-specific labeling of apparatuses.

According to the invention, this object is achieved by an arrangement having
an apparatus and
a display device that has an electronic paper and is secured to the apparatus, wherein
the display device has a locating module by which it is possible to determine an item of country information on the country in which the arrangement is currently located,
the display device is intended to display predetermined data on the apparatus specifically in dependence on the item of country information, and
the display device has its own energy store, as a result of which an energy supply is ensured independently of the apparatus, and by which it may be operated autonomously. Here, the term "country" is understood also to represent, for example, a province or territory.

Advantageously, an apparatus or device is thus provided with the so-called "electronic paper", whereof the display is variable. The display device has a locating module by which the geographical location of the display device can be determined. This geographical position data may be obtained by the locating module, for example directly from GPS data or indirectly from IP addresses of the surrounding WLAN, or with GSM (or indeed other radio transmission standards such as UMTS) by way of data from a radio cell or in a similar manner. By reference to the location, it is possible to infer automatically the country in which the display device is located. Thus, an item of country information on the current location can be provided. Using the item of country information, the display on the electronic paper can then be given a country-specific form. Thus, for example, a nameplate or a warning notice may be displayed, in conformance with one or more of the above-mentioned standards, in the official language of the country concerned.

The display device has its own energy store, by which it may be operated autonomously. It is thus possible for a capacitor or battery, which provides the energy supply independently of the apparatus to be labeled by the electronic paper, to be provided in the display device.

In one embodiment, the apparatus includes a machine tool, a production machine, a frequency converter, an (electrical) machine, a gear unit, a controller, a component thereof (e.g. a valve) or similar. Where appropriate, the apparatus also includes a plurality of these components. A motor, a generator or a transformer are conceivable as an electrical machine. An apparatus of this kind may, however, also be a more complex unit comprising a multiplicity of such components.

According to a further embodiment, the display device has a wireless interface for receiving and/or transmitting data to be displayed. This means that the data to be displayed on the electronic paper, such as model information or warnings, may already be transmitted wirelessly to the display device at the factory at the time of manufacture, or indeed in the event of servicing. As an alternative, wired data transfer is of course also possible if the display device provides for this. Particular advantages result if the information stored in the display device can be transmitted wirelessly to an external device, for example if there is no line of sight. The data can be transmitted to a mobile display device (e.g. a smartphone) or indeed to another component or machine in order to capture the data of the device from a certain distance (with or indeed without a line of sight).

Where appropriate, the display device has an operating element, operation whereof results in the item of country information being obtained by the locating module. This means that obtaining of the item of country information or the location of the display device has to be triggered by operation of an operating element. As a result, the item of country information can be updated in a highly energy-saving manner.

As an alternative, however, the locating module may also be intended to obtain the item of country information automatically at predetermined time intervals. This has the advantage that the operating staff or the user does not need to concern themselves with how the information displayed on the electronic paper can be represented in country-specific manner in accordance with the current location. Rather, in this case the electronic paper displays the information automatically in the manner required in the country in which the display device is located at that moment. In particular, the relevant official language is selected for texts. Preferably, the display device provides the possibility of selecting the language manually as well.

In a further embodiment, the display device may be intended to change the direction of display, in response to an operator action or automatically in dependence on the position of the display device. For example, the display is rotated through 90 degrees if a control button is pressed. As an alternative, however, the display device may also have for example a gyroscopic element that automatically determines the vertical or horizontal direction and, in dependence thereon, adjusts the direction of the display automatically.

In an advantageous embodiment, the display device has an illumination element for illuminating a display of the display device. This is particularly advantageous if the arrangement is set up in a poorly lit region, so that the electronic paper can still be read even in low ambient light.

Moreover, the display device may have a credential checking unit by which an authorization to access a data processing unit of the display device can be checked. Thus, for example, an access code or a password may be checked in the event of data access to the display device. In this way, it can be ensured that changes can only be made or data can only be stored and deleted if the operator has the appropriate authorization.

The display device may have a data interface to the apparatus, and be intended to display by optical technology status information relating to the apparatus that is updated in response to an operator action at the display device, or is updated after a predetermined time interval. This means that the display device can receive data directly from the apparatus and can display it, where appropriate after further processing. In this way, the display device also serves as an optical interface to the apparatus for an operator or user.

Further, the display device may have at least one sensor element for capturing status data relating to the apparatus. This means that the display device can itself serve as a sensor in order to capture and display data from the apparatus.

The above-mentioned object is moreover achieved by a method for displaying an item of information relating to an apparatus using a display device that has an electronic paper and is secured to the apparatus, by the display device identifying location in an automated manner in that an item of country information on the country in which the apparatus is currently located is determined, and predetermined data on the apparatus being displayed on the display device specifically in dependence on the item of country information, wherein the display device has its own energy store, as a result of which energy is supplied independently of the apparatus, and by which it is operated autonomously.

Similarly to the advantages and developments of the above-mentioned arrangement, corresponding advantages and developments are also produced for the method according to the invention. Here, the functional features described in conjunction with the arrangement can be regarded as method features relating to the method.

BRIEF DESCRIPTION OF THE DRAWING

The present invention will now be described in more detail with reference to the attached drawings, in which.

DETAILED DESCRIPTION OF PREFERRED EMBODIMENTS

The exemplary embodiments described in more detail below represent preferred embodiments of the present invention. It should be noted here that the features described can be implemented not only in the combinations mentioned but also when used alone or in other technically appropriate combinations.

Figure 1:
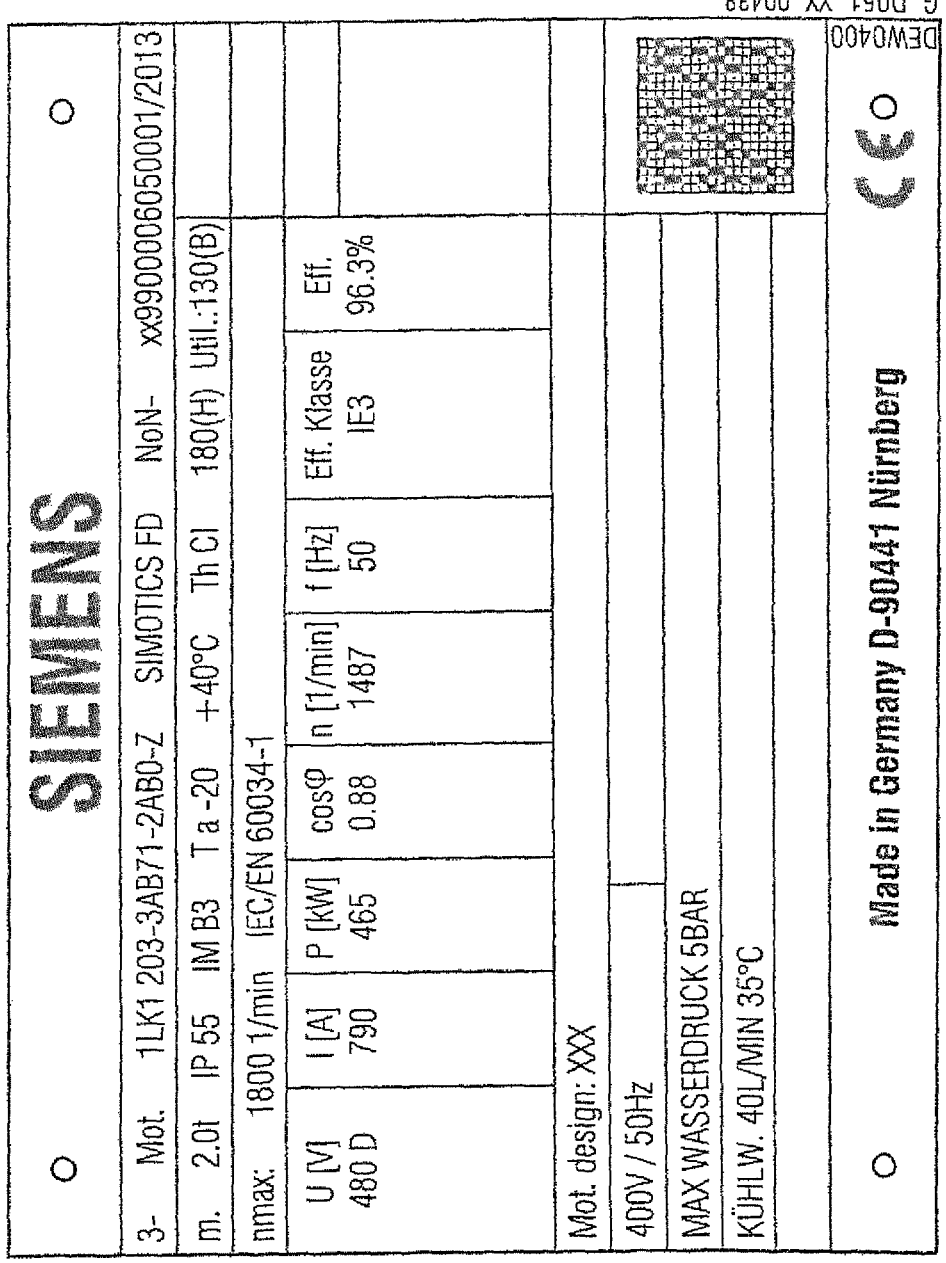
FIG. 1 shows an exemplary nameplate.
Figure 2:
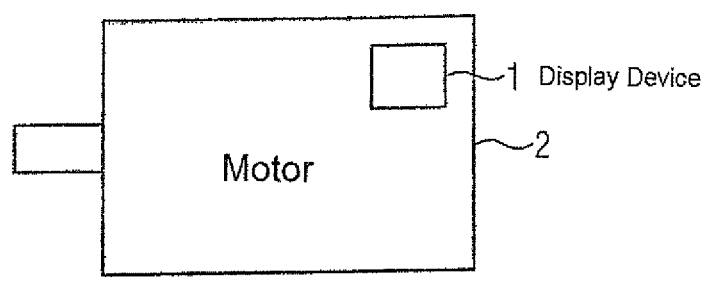
FIG. 2 shows an example of an arrangement according to the invention, with motor and display device.

FIG. 2 shows an apparatus having a display device 1, which together represent an example of an arrangement according to the invention. The apparatus is in this case a motor 2. The display device 1 is mounted fixedly on the motor 2. The display device 1 has a display that takes the form of electronic paper (a-paper). Moreover, the display device 1 has a locating module, for example based on GPS, in order to capture the current location of the motor 2. The locating module is able to associate the item of location information of the motor with a country in which the motor is currently located. Then, the nameplate from FIG. 1 is for example displayed on the a-paper in the language that corresponds to the official language of the country in which the motor 2 is currently located. Instead of the nameplate or rating plate, however, a warning notice may for example also be displayed by the e-paper display. Where appropriate, the display device 1 also has a plurality of such e-paper displays in order to display both a nameplate and a warning notice in the current official language.

The e-paper display or the entire display device 1 should be permanently secured to the machine or apparatus in a suitable manner. Moreover, the e-paper display of the display device 1 should be protected from environmental factors such as temperature, mechanical influences, moisture, noxious gases, salts and so on in the ambient area in a suitable manner (e.g. housing, transparent cover, film, etc.).

Figure 3:
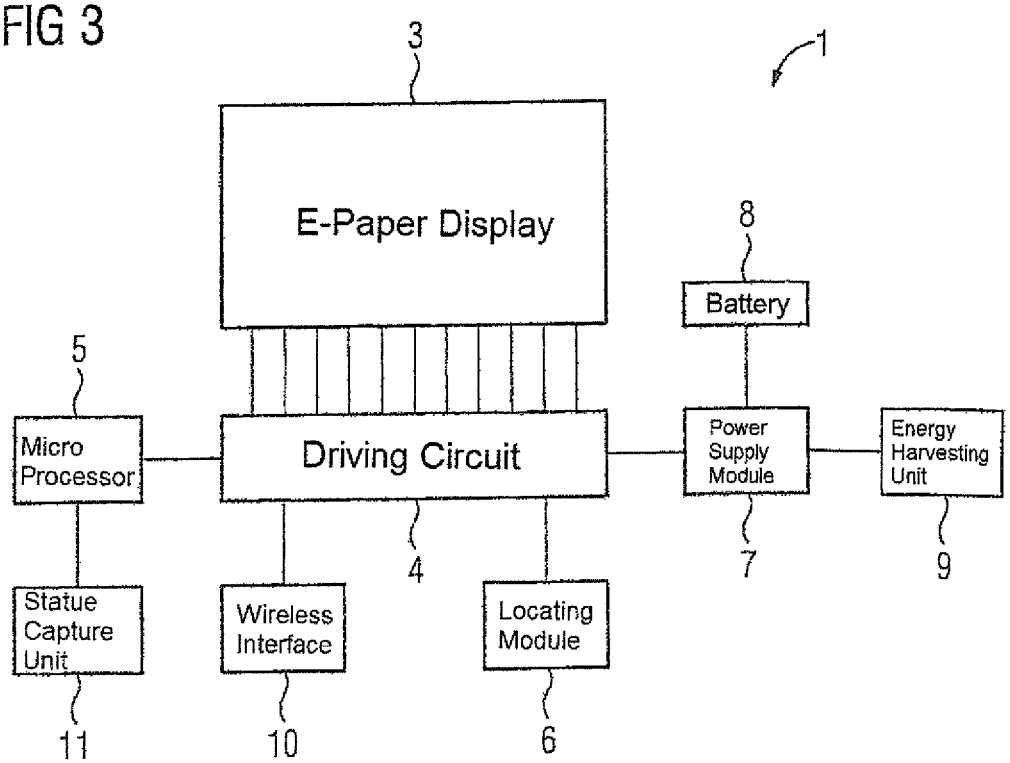
FIG. 3 shows a block diagram of a display device.

FIG. 3 shows a schematic block diagram of a display device 1. The latter has the above-mentioned e-paper display 3. This e-paper display 3 is connected in conventional manner to a driving circuit 4 that, like the components below, is part of the display device 1 according to the present example. In principle, however, other hardware solutions may also be found.

Connected up to the driving circuit 4 is a microprocessor 5 having a data store. Likewise connected up to the driving circuit 4 or the microprocessor 5 is a locating module 6 by which the location of the display device 1, and hence the location of the apparatus equipped with the display device 1, can be determined automatically.

The supply of power to the display device 1 can be ensured by a particular power supply module 7. This power supply module 7 obtains its energy for example from a battery 8 or a capacitor (e.g. Goldcap), which is not illustrated. The battery 8 can be recharged, if this is necessary over the service life, by a so-called energy-harvesting unit 9. A unit 9 of this kind could be implemented for example by a thermoelectric unit, piezo element, inductive energy tapping unit or solar panel. Where appropriate, there could also be temporary coupling up to an external voltage source (power supply), however. Moreover, the energy could also be drawn from the apparatus on which the display device 1 is mounted.

The data or information to be displayed is preferably stored in the display device 1 itself, for example in an embedded system (for example integrated in the microprocessor 5) that is connected to the display 3. However, if necessary the information may also be transmitted online, preferably by way of radio communications, for example from a server or a cloud.

If all the desired information cannot be displayed in its entirety on one page, then the information may be displayed alternately for a certain period, using either a scroll mode or alternating display mode. Because changing the display information takes energy, this should only be carried out on request, or only if there is sufficient energy available. The request to change the display may be made in the broadest possible variety of ways, for example by a locally mounted button, wirelessly over a radio or indeed optical connection, by gesture control, by voice control, by touching the display 3 and swiping gestures, or similar.

In a variant embodiment, the information is displayed in pre-set manner, always in the official language of the country in which the machine is currently located. The country location is determined automatically with the aid of the locating module that is coupled to the e-paper display. By way of example, locating modules 6 operate on the basis of GPS, or they take the form of UMTS/LTE radio modules for determining a radio cell. Where necessary, it is also possible for the operator to switch to any other stored language as desired. Other types of switchover are mentioned above.

As was mentioned in the introduction, it must be possible for nameplates to be read in the installed position of the apparatus (e.g. motor 2). If the installed position of the apparatus does not permit the e-paper display to be read, then the information displayed can be rotated (for example through +/−90 degrees, 180 degrees). Rotation of this kind may be performed by pressing a button or automatically, by an integrated gyroscope function, similar to that in smartphones.

If it is nonetheless not possible to read the e-paper display, the information may be transmitted, optionally by wired methods (e.g. USB, Ethernet) or indeed wirelessly (radio communications, optically, acoustically) to another suitable display device (e.g. smartphone, another e-paper display, VR headset). For wireless transfer, the display device 1 may have a particular wireless interface 10. Wireless or wired output of the information is readily possible, since the information to be displayed is necessarily also in electronic/digital form for the e-paper display.

If there is a line of sight, electronic/digital output of the information may also be performed optically by appropriate evaluation devices through the display of barcodes, QR codes or other formats.

For poor light conditions, the e-paper display may be equipped with active illumination. This may be activated for a predetermined period, for example by a button, gesture control, touching the display or similar.

The information to be displayed on the e-paper display should only be capable of being changed by the manufacturer of the apparatus or their servicing staff. For this purpose, corresponding safety measures should be provided, such as access codes or electronic keys for changing the stored information.

In addition to statically stored information, the display device 1 may also display variable status information of the apparatus or machine, if the display device 1 is constructed appropriately. For this, for example an optional status capture unit 11, or a sensor element, by which for example sensor evaluation can be performed would need to be provided. This status capture unit 11 may be connected up to the microprocessor 5. The status information may thus be captured by the display device 1 itself, where appropriate (for example by integrated temperature or vibration sensors). This information may, however, also be captured by an embedded system additionally installed in the apparatus, and transmitted to the display device 1. A status that varies slowly, such as the display of a traffic signal color, is suitable for capture and display on the e-paper display, but continuously variable information (e.g. speed of rotation, temperature) is also suitable.

Advantageously, it is thus possible for the invention to achieve a situation in which there is virtually no longer any variation in the plates within a production series, since the plates differ only in the content to be displayed. Labeling can be performed stepwise during production, from one production step to the next. Variations in the configuration of the product are possible during the manufacturing procedure. Moreover, accompanying notes for warning and safety notices are no longer needed if, in addition to the information on a nameplate, the warning notices are also displayed on the display device 1.

In a preferred embodiment, the correct official language of the country in which the machine is currently located is always displayed. A further advantage consists in the fact that, if machines are upgraded, nameplate information can be changed and supplemented on the spot by the servicing staff. Moreover, if limited space is available for the plate, more information can be displayed, as a result of alternating displays, than is the case with conventional plates. Further, there is no longer any need to provide the machine or apparatus with additional plates and to glue them on when the apparatus is set up. There is thus no longer a risk that the wrong plate is glued on.

Likewise advantageous is the fact that the customs or incoming or outgoing goods inspection can determine which product is in fact in the packaging (which even nowadays is a logistics problem), by reading the information by way of radio communications, for example. However, a particular advantage of the arrangement according to the invention consists in the fact that the external supply of power supply is not necessarily required as in the case of conventional displays, since the energy required by electronic paper is extremely low (only when the display changes). Recharging may be performed simply by harvesting energy from the apparatus (e.g. drive component).

What is claimed is:

1. An arrangement, comprising:
    an apparatus comprising a machine tool, a production machine, a frequency converter, an electrical machine, a gear unit, a controller, or a component thereof; which require a region-specific unambiguous identification label, and
    a display device embodied as a nameplate, rating plate, warning notice or safety notice, the display device secured to the apparatus and configured to display the identification label, the display device comprising
    an electronic paper,
    an energy store supplying electrical energy to the display device to enable independent operation without receiving external power from the apparatus,
    a locating module having a wireless interface for receiving GPS or UMTS/LTE radio signals and determining therefrom an item of country Information on the country in which the arrangement is currently located,
    said display device being configured to display the region-specific unambiguous identification label in a form and language commensurate with the item of country information.

2. The arrangement of claim 1, wherein the wireless interface is further configured to transmit data from the display device or the apparatus.

3. The arrangement of claim 1, wherein the locating module is configured to obtain the item of country information automatically at predetermined time Intervals.

4. The arrangement of claim 1, wherein the display device is configured to change a direction of display in response to an operator action.

5. The arrangement of claim 1, wherein the display device is configured to change a direction of display automatically in dependence on a position of the display device.

6. The arrangement of claim 1, wherein the display device comprises an illumination element for illuminating a display of the display device.

7. The arrangement of claim 1, wherein the display device is configured to check authorization to access a data processing unit of the display device.

8. The arrangement of claim 1, wherein the display device comprises a data interface to the apparatus, said display device being configured to display status information relating to the apparatus, the status information being updated in response to an operator action at the display device.

9. The arrangement of claim 1, further comprising a sensor element operatively connected to the apparatus for capturing status data relating to the apparatus.

10. A method for displaying an item of information relating to an apparatus, selected from the group consisting of a machine tool, a production machine, a frequency converter, an electrical machine, a gear unit, a controller, or a component thereof, which require a region-specific unambiguous identification label, by using a display device embodied as a nameplate, rating plate, warning notice or safety notice, the display device secured to the apparatus and configured to display the identification label and including an electronic paper, said method comprising:
    connecting the display device to an energy store supplying electrical enemy to the display device to enable independent operation without receiving external power from the apparatus,
    automatically receiving via a wireless interface GPS or UMTS/LTE radio signals which enable the display device to identify therefrom an item of country information on the country in which the apparatus is currently located; and
    displaying on the display device the region-specific unambiguous identification label in a form and language commensurate with the item of country information.

* * * * *